UNITED STATES PATENT OFFICE.

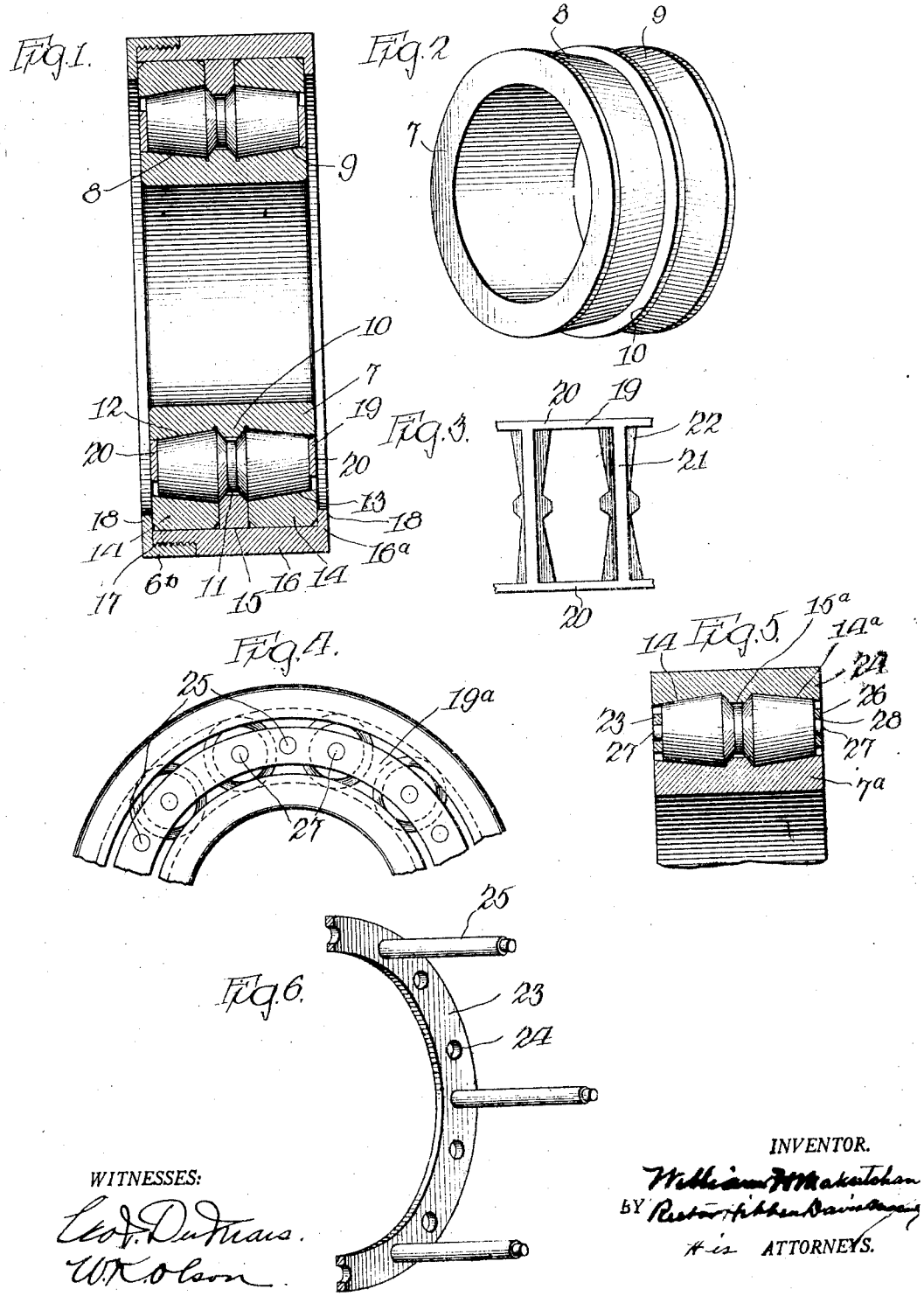

WILLIAM H. MAKUTCHAN, OF CHICAGO, ILLINOIS, ASSIGNOR TO MAKUTCHAN ROLLER BEARING COMPANY, OF CHICAGO, ILLINOIS, A CORPORATION OF ARIZONA.

ROLLER-BEARING.

1,275,715.     Specification of Letters Patent.     Patented Aug. 13, 1918.

Application filed December 4, 1916. Serial No. 135,015.

*To all whom it may concern:*

Be it known that I, WILLIAM H. MAKUTCHAN, a citizen of the United States, residing at Chicago, in the county of Cook and State of Illinois, have invented certain new and useful Improvements in Roller-Bearings, of which the following is a specification.

This invention is in the nature of an improvement on a roller bearing disclosed in my Letters Patent of the United States No. 904,343, granted November 17, 1908, in which the rollers are in the form of double cones united at their bases and having a circumferential groove about their centers. The inner track for the rollers is of a cross-section to fit the rollers and includes a rib entering said groove, and the outer track is composed of two annular members with tapered track-faces and adjustable toward each other to take up wear. The rib maintains the rollers in central position. My improvement comprises providing a rib also on the outer track coöperating with the central groove of the roller whereby axial movement of the outer track of the bearing relative to the inner bearing member is prevented and end thrust taken up. The construction is such that the bearing may be used in any situation where either lateral or end thrust, or a combination of the two is to be provided for.

In the accompanying drawing I have shown and in the following specification described two preferred forms of my invention. It is to be understood, however, that the specific disclosure is for the purpose of exemplification only, and that the scope of the invention is defined in the following claims in which I have endeavored to distinguish it from the prior art so far as known to me without, however, relinquishing or abandoning any portion or feature thereof.

In the drawing Figure 1 is a central axial section through one of the preferred forms of my invention; Fig. 2 a perspective view of one of the elements thereof; Fig. 3 is a fragmentary elevation of another element thereof; Fig. 4 a fragmentary elevation and Fig. 5 an axial section of a portion of a second form of the invention; and Fig. 6 a perspective of a portion of one of the elements of the bearing shown in Figs. 4 and 5.

In both forms of the invention the inner track member 7 is substantially of the form shown in my said patent, the outer surface thereof being conical at 8, 9, with the smaller diameter toward the center, the conical surfaces being separated by an interposed rib 10, the side walls of which are sloped to coöperate with the similarly shaped grooves in the rollers as hereinafter described. The rollers differ from those of the patented construction substantially only in the matter of proportions, and in that the central groove is formed at its base with a fillet 11, the ends of the rollers being conical or tapered at 12, 13, and the bases of the conical portions united as shown.

So far as described above the two forms of the invention illustrated are identical, and they are also alike in that the outer track is also formed with a rib which extends into and coöperates with the grooves of the rollers. Specifically, however, this outer track is formed differently in the two modifications. In the modification shown in Figs. 1, 2 and 3, the outer track is formed in three sections comprising two annular end members 14, 14, having an inner tapered bearing surface corresponding to the taper of the rollers, and an intermediate rib member 15 which, for the purpose of assembling, is formed in two or more sections, which together make a complete annulus coöperating with the grooves in the rollers. A casing or supporting body 16 is illustrated as formed in two sections 16ª, 16ᵇ screwed together at 17, and provided with internal flanges 18, 18, overlapping the members 14 and thus holding them in proper relative position. Obviously the casing could be formed integral, the flanges being spun over the annular tracks 14 if desired. An annular separator or spacing member 19 surrounds the inner member 7 and comprises a pair of rings 20, 20, spaced apart the length of the rollers and connected by ribs 21 and webs 22. The webs, as shown in Fig. 3, are so tapered that the openings between the same, fit loosely about the rollers which are separately contained therein, and the rings 20, 20 have an internal diameter which enables them to loosely fit upon the ends of the inner track member 7. The bearing may be assembled by first placing the separator about the inner member 7, dropping the rollers into the compartments of the separator, placing the outer track members in position with the sectional rib between them and applying the casing.

In the modification shown in Figs. 4, 5 and 6, the external track member as well as the internal member is integral, and the conical track surfaces 14ª, 14ª and the intermediate rib 15ª are formed directly thereon. The cage or separator 19ª is in this instance formed of two separable sections, one of which comprises a ring 23 formed with a series of bearing openings 24, and a series of spacing bars 25. The other member 26 is a similar ring having openings into which the reduced ends of the spacer bars 25 may be inserted and up-set to form a rigid structure therewith. In assembling this form of the invention the rollers, which are provided on their ends with trunnions 27, 27, are inserted to the required number between the inner track 7ª and the outer track 24 by first holding the track members in eccentric position relative to each other, and inserting the rollers in the enlarged part of the opening between said members. After the rollers have been inserted to the required number, the inner and outer track members are brought to concentric position, the rollers properly placed and the member 23 of the separator brought into position with the rods 25 extending between adjacent rollers, and the roller trunnions inserted in the openings 24. The other separator member 26 is then applied to the other end of the bearing, the trunnions of the rollers inserted in the bearings 28 and the rods 25 in the openings provided to receive them, and the ends of the rods then upset to secure the parts together.

Obviously the construction may be varied within wide limits without departing from my invention. Thus the surfaces of the rollers which have been described as conical, need not be truly so, but may be curved longitudinally so long as they taper toward the outer ends of the rollers.

From the above description it will be apparent that by reason of the double rib construction the bearing is well adapted to take up end as well as lateral thrust, and the tendency of the rollers to tilt under end thrust is entirely obviated.

I claim:

1. In a device of the class described, a series of rollers tapered at their opposite ends and provided each with an intermediate groove, an integral internal track member having tapered bearing surfaces and an intermediate rib engaging the grooves in the rollers, and an integral outer track member having tapered bearing surfaces, and an intermediate rib engaging the grooves of the rollers.

2. In a device of the class described, an inner annular track member having tapered end portions and an intermediate rib, a series of rollers surrounding the track member, the ends of said rollers being tapered to correspond to said track member, and the intermediate portion of the rollers being grooved to receive said rib, an integral outer track member having tapered end portions corresponding to the taper of the rollers, and a separator for the rollers comprising a pair of ring members engaging the opposite ends of the rollers respectively, and connecting bars between said ring members extending between adjacent rollers.

WILLIAM H. MAKUTCHAN.

Witnesses:
 HIRSCH E. SOBLE,
 SIDNEY E. LEVY.